United States Patent
Hayashi et al.

(10) Patent No.: US 8,375,703 B2
(45) Date of Patent: Feb. 19, 2013

(54) EXHAUST GAS PURIFICATION DEVICE

(75) Inventors: Miwa Hayashi, Saitama (JP); Takeshi Miyamoto, Saitama (JP); Fumiyasu Kurogi, Saitama (JP); Takefumi Mochizuki, Saitama (JP); Kimiko Seto, Saitama (JP)

(73) Assignee: UD Trucks Corporation, Saitama (JP)

( * ) Notice: Subject to any disclaimer, the term of this patent is extended or adjusted under 35 U.S.C. 154(b) by 595 days.

(21) Appl. No.: 12/600,799

(22) PCT Filed: Mar. 3, 2008

(86) PCT No.: PCT/JP2008/053745
§ 371 (c)(1),
(2), (4) Date: Nov. 18, 2009

(87) PCT Pub. No.: WO2008/142893
PCT Pub. Date: Nov. 27, 2008

(65) Prior Publication Data
US 2010/0146950 A1    Jun. 17, 2010

(30) Foreign Application Priority Data
May 18, 2007  (JP) ................................. 2007-133124

(51) Int. Cl.
*F01N 3/00* (2006.01)
*F01N 3/10* (2006.01)
*F01N 1/00* (2006.01)

(52) U.S. Cl. ................. 60/286; 60/295; 60/301; 60/303; 60/324

(58) Field of Classification Search .................... 60/286, 60/295, 297, 301, 303, 311, 324; 181/227, 181/228, 269; 422/176
See application file for complete search history.

(56) References Cited

U.S. PATENT DOCUMENTS

| 6,312,650 B1* | 11/2001 | Frederiksen et al. ......... 422/180 |
| 6,442,933 B2* | 9/2002 | Rusch ............................. 60/286 |
| 2002/0187093 A1* | 12/2002 | Muller et al. ................. 423/235 |
| 2003/0108457 A1 | 6/2003 | Gault et al. |
| 2007/0012035 A1 | 1/2007 | Amemiya et al. |

FOREIGN PATENT DOCUMENTS

| EP | 1736645 A1 | 12/2006 |
| JP | 924246 A | 1/1997 |

(Continued)

OTHER PUBLICATIONS

Nishiyama, Machine Translation of JP 2005-155404 A, Jun. 16, 2005.*

*Primary Examiner* — Kenneth Bomberg
*Assistant Examiner* — Audrey K Bradley
(74) *Attorney, Agent, or Firm* — Michael Best & Friedrich LLP (57) ABSTRACT

An exhaust gas purification device is capable of diffusing and introducing a reducing agent into a $NO_x$ catalyst arranged in a downstream side exhaust gas passage. A housing of the device includes a main body in which an upstream side exhaust gas passage and the downstream side exhaust gas passage are housed, and a cap attached to a first surface of the main body provided with an outlet side opening of the upstream side exhaust gas passage and an inlet side opening of the downstream side exhaust gas passage. At least one of the first surface of the main body and a second surface in the cap which faces the first surface includes a guide portion, for guiding an exhaust gas flow, and a reducing agent diffusion portion, for facilitating mixing of the reducing agent with the exhaust gas.

11 Claims, 8 Drawing Sheets

FOREIGN PATENT DOCUMENTS

| | | | |
|---|---|---|---|
| JP | 2005155404 A | * | 6/2005 |
| JP | 2005273580 A | | 10/2005 |
| WO | 0142630 A2 | | 6/2001 |
| WO | 2004113690 A1 | | 12/2004 |
| WO | WO 2006014129 A1 | * | 2/2006 |

* cited by examiner

EXHAUST GAS PURIFICATION DEVICE

TECHNICAL FIELD

The present invention relates to an exhaust gas purification device for an internal combustion engine, and relates specifically to an exhaust gas purification device for an internal combustion engine that includes an exhaust gas passage having a return portion in the middle thereof, and that reduces and removes $NO_x$ in exhaust gas using a reducing agent.

BACKGROUND ART

Generally, technologies are known that remove particulate matter (hereinafter referred to as PM) and nitrogen oxide (hereinafter referred to as $NO_x$) contained in exhaust gas exhausted from an internal combustion engine, such as a diesel engine.

Among the technologies, as a technology to remove $NO_x$, an exhaust gas purification device that uses a selective catalytic reduction (SCR) system is known. The device injects a reducing agent at an upstream side of a $NO_x$ catalyst arranged in an exhaust gas passage, and causes the reducing agent to flow into the $NO_x$ catalyst together with exhaust gas, thereby effectively decomposing $No_x$ (NO and $NO_2$) in the exhaust gas to nitrogen and the like and discharging them.

Figure 8:
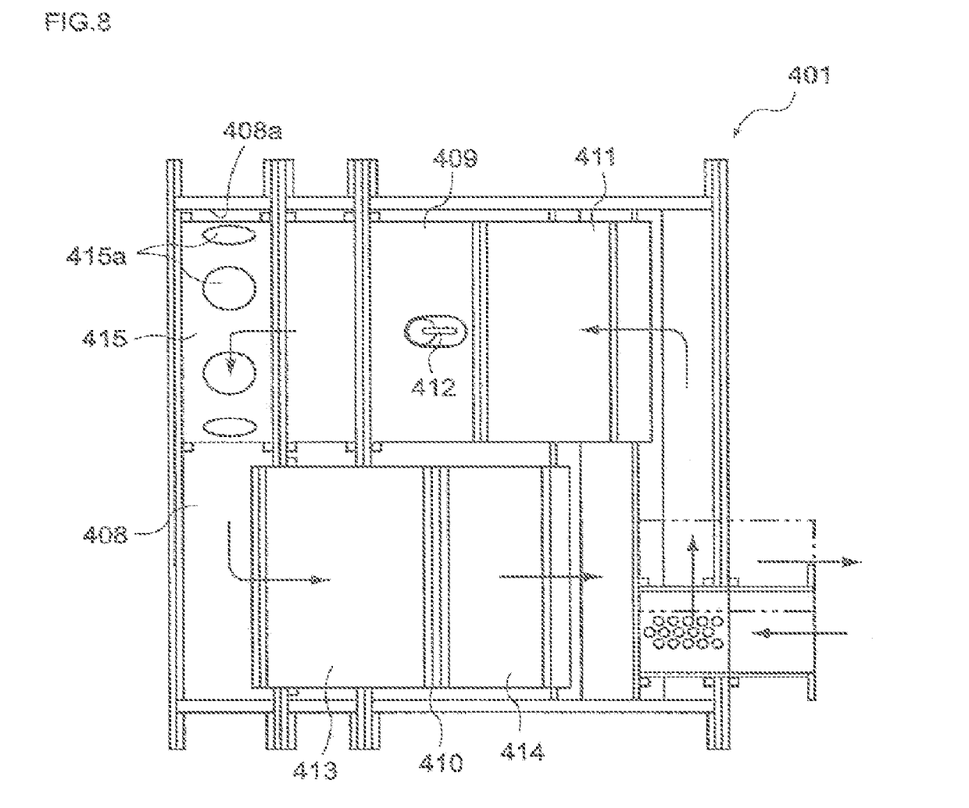
FIG. 8 is a diagram illustrating the structure of an exhaust gas purification device of a related art.

As a form of the exhaust gas purification device described above, a muffler has been proposed that functions to purify $NO_x$ in exhaust gas, and has a structure in which the flow direction of the exhaust gas is forcibly returned in the muffler. More specifically, a muffler 401 with an exhaust gas purification function is disclosed (refer to Patent Document 1) in which, as shown in FIG. 8, an oxidation catalyst 411 and an injection nozzle 412 that injects and supplies a liquid reducing agent are arranged in an upstream side exhaust gas passage 409. A $NO_x$ reduction catalyst 413 and a reducing agent oxidation catalyst 414 are arranged in a downstream side exhaust gas passage 410. A ring member 415 having holes 415a formed in a periphery thereof is provided in a return portion 408. Thus, the exhaust gas is introduced downstream from the holes 415a, and the exhaust gas flow is generated along a return portion wall surface 408a so as to produce a vortex on a vertical plane of the return portion 408.

Patent Document 1: Japanese Patent Application Publication No. JP-A-2005-273580 (Claims, FIG. 1)

DISCLOSURE OF THE INVENTION

Problems That the Invention is to Solve

However, with the structure of the muffler described in Patent Document 1, when the exhaust gas that has passed through the upstream side exhaust gas passage flows into the return portion, the space rapidly widens, which causes the flow rate in the return portion to lower. Accordingly, it is difficult for the reducing agent supplied into the exhaust gas passage to mix sufficiently with the exhaust gas, and variation occurs in distribution of the exhaust gas flowing into the downstream side exhaust gas passage. As a result, variation occurs in distribution of the reducing agent supplied to the $NO_x$ catalyst. Therefore, there is a possibility that $NO_x$ purification efficiency of the $NO_x$ catalyst will deteriorate.

In order to sufficiently mix the reducing agent with the exhaust gas, it is conceivable to provide diffusion means, such as a perforated plate, in the return portion. However, depending on the arrangement of the diffusion means, the diffusion means may obstruct the flow of the exhaust gas. As a result, there is a possibility that a large proportion of the exhaust gas may flow into the downstream side exhaust gas passage without passing through the diffusion means.

To address this, the inventors of the present invention have made strenuous efforts, and have found that the above-described problems can be solved, in an exhaust gas purification device having a return portion in an exhaust gas passage, by providing a prescribed guide portion and a reducing agent diffusion portion in at least one of a main body and a cap that form the return portion. Thus, the inventers have achieved the present invention. Therefore, it is an object of the present invention to provide an exhaust gas purification device that is capable of diffusing and introducing a reducing agent into a $NO_x$ catalyst arranged in a downstream side exhaust gas passage. This exhaust gas purification device is formed compactly by providing a return portion in an exhaust gas passage.

Means for Solving the Problems

According to the present invention, an exhaust gas purification device is provided which includes: an exhaust gas passage having a return portion; a reducing agent supply portion which is arranged in the return portion or an exhaust gas passage on an upstream side of the return portion and which supplies a reducing agent into the exhaust gas passage; and a reduction catalyst which is arranged in an exhaust gas passage on a downstream side of the return portion and which reduces and purifies nitrogen oxide using the reducing agent. The exhaust gas purification device is characterized in that a housing of the exhaust gas purification device includes a main body in which the upstream side exhaust gas passage and the downstream side exhaust gas passage are housed, and a cap which is attached to a first surface of the main body that is provided with an outlet side opening of the upstream side exhaust gas passage and an inlet side opening of the downstream side exhaust gas passage. The return portion is formed by a space surrounded by the main body and the cap. At least one of the first surface of the main body and a second surface in the cap which faces the first surface is provided with a guide portion, for guiding an exhaust gas flow, which is arranged in a direction intersecting with the first surface and the second surface, and a reducing agent diffusion portion, for facilitating mixing of the reducing agent with the exhaust gas, which is arranged in the middle of the flow of the exhaust gas guided by the guide portion. Thus, the above-described problems can be solved.

Further, with the structure of the exhaust gas purification device of the present invention, it is preferable that the guide portion includes shielding plates that are respectively in contact with the first surface and the second surface.

Further, with the structure of the exhaust gas purification device of the present invention, it is preferable that the reducing agent supply portion is arranged on an upstream side of the reducing agent diffusion portion in the return portion, and the guide portion includes first guide plates for regulating the flow of the exhaust gas toward the reducing agent diffusion portion.

Furthermore, with the structure of the exhaust gas purification device of the present invention, it is preferable that the guide portion includes second guide plates for regulating the exhaust gas that has passed through the reducing agent diffusion portion toward the inlet side opening of the downstream side exhaust gas passage.

Moreover, with the structure of the exhaust gas purification device of the present invention, it is preferable that the guide portion is arranged in the middle of the flow of the exhaust gas, and includes straightening vanes for evenly guiding the exhaust gas to the reducing agent diffusion portion.

Advantage of the Invention

According to the present invention, in the exhaust gas purification device in which the exhaust gas passage is returned in the middle thereof and size reduction of the entire device is achieved, a prescribed guide portion is provided on at least one of the first surface of the main body and the second surface of the cap, which form the return portion. The guide portion makes it possible to guide the exhaust gas to the downstream side exhaust gas passage while suppressing reduction in the flow rate of the exhaust gas introduced into the return portion. In addition, because the reducing agent diffusion portion is arranged in the middle of the flow of the exhaust gas guided by the guide portion, it is possible to facilitate mixing of the reducing agent. Accordingly, the reducing agent is easily diffused and introduced into the $NO_x$ catalyst positioned in the downstream side exhaust gas passage. Thus, it is possible to improve the $NO_x$ purification efficiency.

Further, the return portion is formed by the space surrounded by the main body and the cap. With this structure, the guide portion and the reducing agent diffusion portion can be easily arranged in the return portion.

Further, in the exhaust gas purification device of the present invention, by providing prescribed shielding plates as the guide portion, the flow path of the exhaust gas in the return portion is defined, and reduction in the flow rate can be suppressed. At the same time, it is possible to inhibit the exhaust gas from entering a region where the exhaust gas is likely to flow poorly.

Furthermore, in the exhaust gas purification device of the present invention, by providing as the guide portion the first guide plates that guide the exhaust gas to the reducing agent diffusion portion, the exhaust gas can be caused to pass through the reducing agent diffusion portion, and vaporization and mixing of the reducing agent can be facilitated.

Moreover, in the exhaust gas purification device of the present invention, by providing as the guide portion the second guide plates that guide the exhaust gas that has passed through the reducing agent diffusion portion to the downstream side exhaust gas passage, it is possible to guide the exhaust gas such that the supplied reducing agent does not enter and adhere to a region other than the $NO_x$ catalyst.

Moreover, in the exhaust gas purification device of the present invention, by providing prescribed straightening vanes in the middle of the flow of the exhaust gas, the flow rate of the exhaust gas is equalized, and it is possible to evenly introduce the exhaust gas to the reducing agent diffusion portion.

BEST MODE FOR CARRYING OUT THE INVENTION

Hereinafter, an embodiment relating to an exhaust gas purification device of the present invention will be specifically described with reference to the appended drawings. However, the embodiment is just one form of the present invention and in no way limits the present invention, and any modification can be made within the scope of the present invention.

Note that, in the respective drawings, structural members that are the same are denoted with the same reference numerals, and explanation thereof is omitted as appropriate.

1. Exhaust Gas Purification Device (Muffler)

Figure 1:
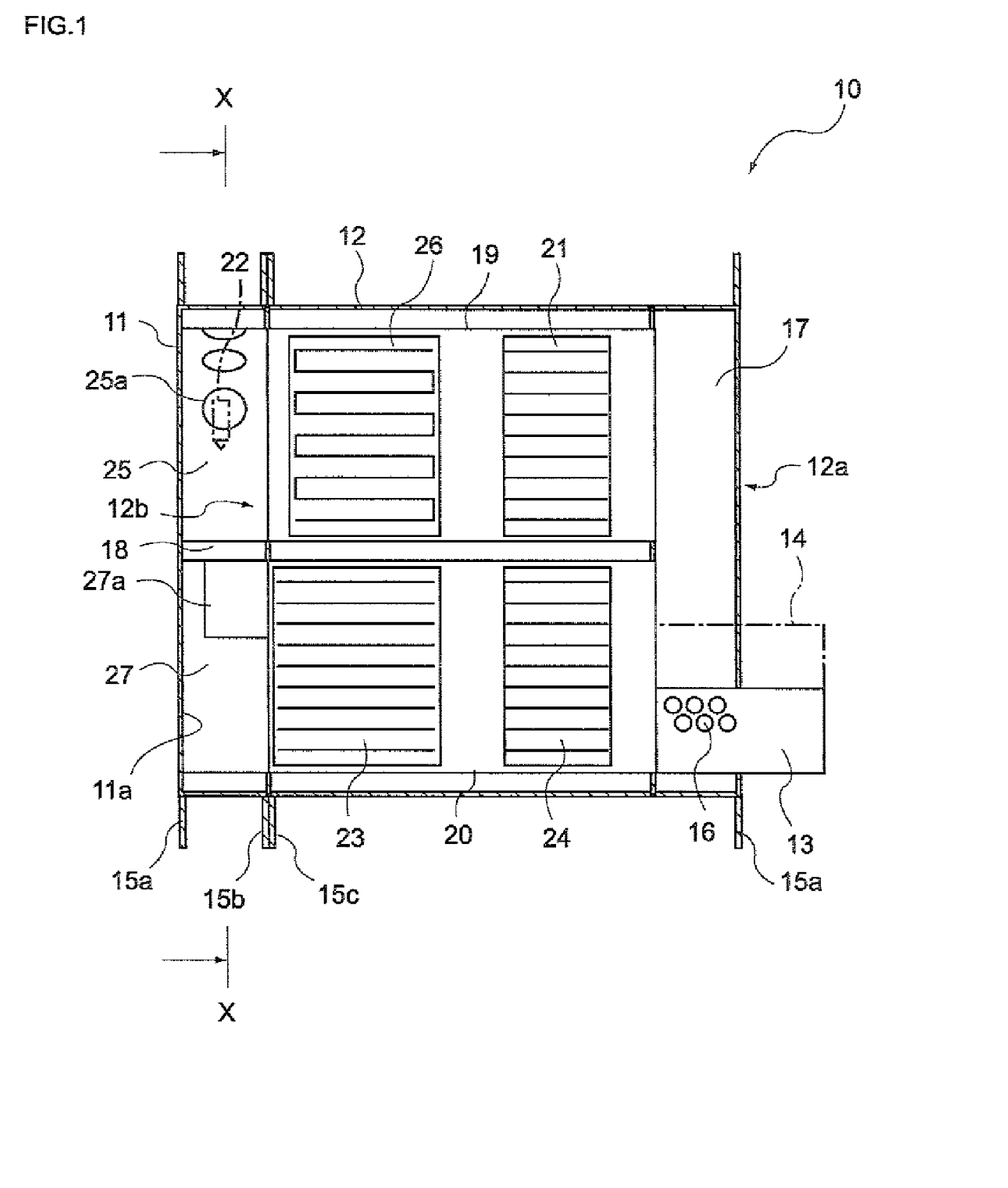
FIG. 1 is a diagram illustrating the structure of an exhaust gas purification device of a present embodiment.

FIG. 1 shows an example of the inner structure of an exhaust gas purification device 10 according to the embodiment of the present invention, which is structured as a muffler with an exhaust gas purification function.

A housing of the exhaust gas purification device 10 is formed by a main body 12 and a cap 11, and the exhaust gas purification device 10 has a square shape as a whole. A plurality of flange portions 15a used to fix the exhaust gas purification device 10 to a vehicle are provided on an outer periphery of the housing. Further, the main body 12 and the cap 11 are respectively provided with fitting flange portions 15b and 15c, and the main body 12 and the cap 11 are fixed with screws or the like (not shown in the figures).

In the housing, a side surface (a right side surface in the figure) 12a of the main body 12 is provided with an exhaust gas inlet portion 13 and an exhaust gas outlet portion 14 (shown by the double-dashed line in the figure). Further, an expansion chamber 17, a return portion 18, an upstream side exhaust gas passage 19, and a downstream side exhaust gas passage 20 are formed in the main body 12. The expansion chamber 17 communicates with the exhaust gas inlet portion 13 via multiple holes 16 formed in the exhaust gas inlet portion 13. The return portion 18 returns the flow of exhaust gas using a side surface 12b on the opposite side to the side surface 12a on which the expansion chamber 17 is arranged. The upstream side exhaust gas passage 19 provides communication between the expansion chamber 17 and the return portion 18. The downstream side exhaust gas passage 20 provides communication between the return potion 18 and the exhaust gas outlet portion 14. The return portion 18 is formed by a space surrounded by the side surface 12b of the main body 12 and an inner surface 11a of the cap 11, and also functions as an expansion chamber for the exhaust gas that flows into through the upstream side exhaust gas passage 19.

Because the exhaust gas passage returns back in this manner, the total length of the exhaust gas purification device 10 is shortened, and size reduction of the entire device is achieved.

An upstream side oxidation catalyst 21 and a particulate filter 26 are disposed in the upstream side exhaust gas passage 19. The particulate filter 26 is a filter that is used to trap particulates such as black smoke particles contained in the exhaust gas, and is disposed on a downstream side of the upstream side oxidation catalyst 21. Further, the upstream side oxidation catalyst 21 is used to oxidize hydro carbon (HC) carbon oxide (CO) and NO in the exhaust gas, or to increase the temperature of the exhaust gas when the particulate filter 26 is regenerating. Further, a $NO_x$ reduction catalyst 23 and a downstream side oxidation catalyst 24 are disposed in the downstream side exhaust gas passage 20. The $NO_x$ reduction catalyst 23 is used to reduce and purify $NO_x$ contained in the exhaust gas using a reducing agent. Further, the downstream side oxidation catalyst 24 is used to oxidize and purify the reducing agent that has passed through the $NO_x$ reduction catalyst 23, and is disposed on a downstream side of the $NO_x$ reduction catalyst 23.

Well known catalysts and filters can be used for the upstream side oxidation catalyst 21, the downstream side oxidation catalyst 24, the particulate filter 26, and the $NO_x$ reduction catalyst 23 described above.

Further, a guide portion and a diffusion plate (that are not shown in the figures) are arranged in the return portion 18. In addition, a reducing agent supply portion 22 is disposed that injects and supplies a liquid reducing agent, for example, urea aqueous solution, hydro carbon or the like. The reducing agent supply portion 22 includes an injection nozzle connected to an air assist type reducing agent supply device, and a reducing agent injection valve that directly injects a pressure-fed reducing agent, and is structured such that the reducing agent is injected and supplied on an upstream side of the diffusion plate. The positional arrangement of the reducing agent supply portion 22 is not particular limited, but it is preferable that diffusion efficiency of the reducing agent into the exhaust gas is taken into consideration when the reducing agent supply portion 22 is positioned.

Figure 2:
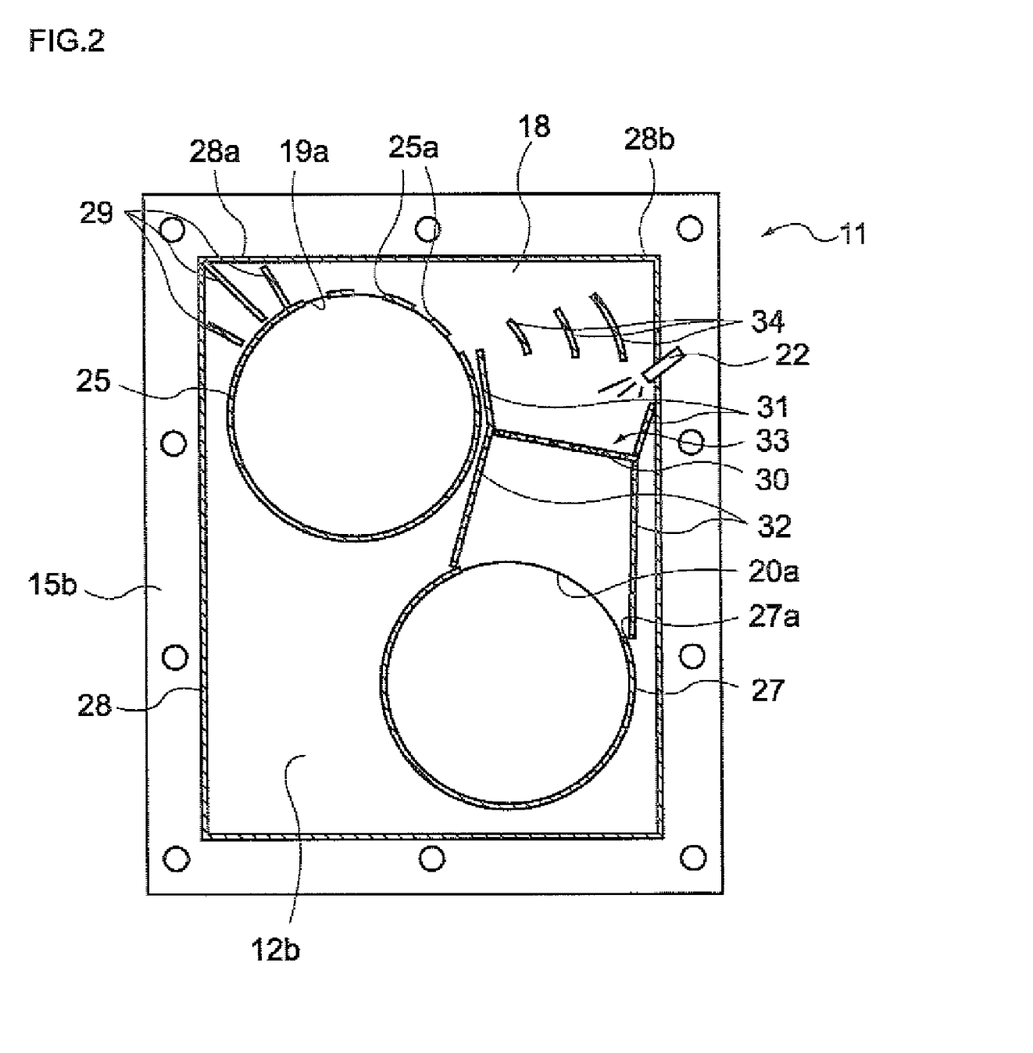
FIG. 2 is a cross sectional view illustrating the structure of a return portion of the exhaust gas purification device of the present embodiment.
Figure 3:
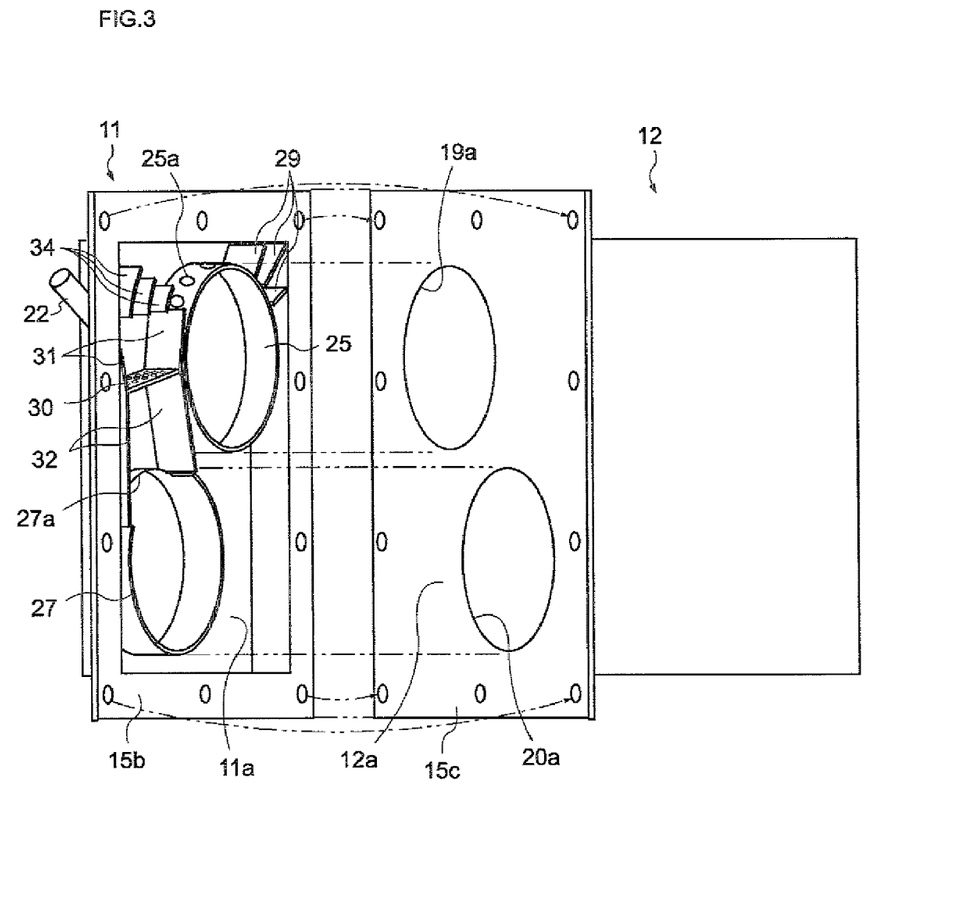
FIG. 3 is a perspective view illustrating the structure of the return portion of the exhaust gas purification device of the present embodiment.

Next, the structure of the return portion 18 of the exhaust gas purification device 10 of the present embodiment will be described in detail with reference to FIG. 2 and FIG. 3. FIG. 2 is a view of an X-X cross section of the exhaust gas purification device 10 of the present embodiment shown in FIG. 1, when viewed in the direction indicated by the arrow. FIG. 3 is a perspective view showing an extended state where the cap 11 is removed from the main body 12.

As shown in FIG. 2 and FIG. 3, an outlet side opening 19a of the upstream side exhaust gas passage 19 and an inlet side opening 20a of the downstream side exhaust gas passage 20 face the return portion 18 of the exhaust gas purification device 10, and they are respectively positioned at opposite corners of a rectangular region of the cross section.

The outlet side opening 19a of the upstream side exhaust gas passage 19 is provided with a first ring-shaped member 25 which includes, in the circumferential direction, a plurality of holes 25a serving as opening portions, and which determines the flow direction of the exhaust gas that flows into the return portion 18 from the upstream side exhaust gas passage 19 via the holes 25a.

Meanwhile, the inlet side opening 20a of the downstream side exhaust gas passage 20 is provided with a second ring-shaped member 27 which includes an opening portion 27a that opens widely at one section in the circumferential direction, and which causes the exhaust gas to flow to the downstream side exhaust gas passage 20 from the return portion 18 via the opening portion 27a.

These ring-shaped members are fixed, by welding or the like, to the inner surface 11a of the cap 11 that faces the side surface 12b of the main body 12, and are arranged to be in contact with the side surface 12b of the main body 12.

Further, on an outer peripheral portion 28 of the cross section shown in FIG. 2, third guide plates 29 are arranged at a corner portion 28a that is close to the outlet side opening 19a of the upstream side exhaust gas passage 19. The third guide plates 29 are also fixed, by welding or the like, to the inner surface 11a of the cap 11, and are arranged to be in contact with the side surface 12b of the main body 12. As a result of providing the third guide plates 29, the flow of the exhaust gas that has been introduced into the return portion 18 via the plurality of holes 25a of the first ring-shaped member 25 is directed to a region that is faced by the opening portion 27a of the second ring-shaped member 27 disposed on the inlet side opening 20a of the downstream side exhaust gas passage 20.

In the example shown in FIG. 2, the three third guide plates 29 are arranged to block between the first ring-shaped member 25 and the outer peripheral portion 28. Therefore, even if a gap is generated between the third guide plates 29 and the first ring-shaped member 25 or the outer peripheral portion 28, the exhaust gas is unlikely to pass beyond the third guide plates 29.

Further, in the region which the exhaust gas that has been introduced into the return portion 18 via the plurality of holes 25a of the first ring-shaped member 25 flows into, and which the opening portion 27a of the second ring-shaped member 27 faces, first guide plates 31 for guiding the exhaust gas to a diffusion plate 30 are arranged. In addition, second guide plates 32 for guiding the exhaust gas that has passed through the diffusion plate 30 to the opening portion 27a of the second ring-shaped member 27 are also arranged in this region. The first guide plates 31 and the second guide plates 32 are also fixed, by welding or the like, to the inner surface 11a of the cap 11, and are arranged to be in contact with the side surface 12b of the main body 12. They are arranged to block between the first ring-shaped member 25 and the second ring-shaped member 27, and between the second ring-shaped member 27 and the outer peripheral portion 28.

Further, a constricted portion 33 that reduces the flow path area is formed in an exhaust gas flow path defined by the first guide plates 31 and the second guide plates 32. The diffusion plate 30 is arranged in the constricted portion 33. Therefore, when the exhaust gas passes through the constricted portion 33, the flow rate is increased. Because the exhaust gas passes through the diffusion plate 30 with the flow rate increased, it is possible to effectively mix and diffuse the reducing agent that has been injected and supplied into the exhaust gas on the upstream side of the diffusion plate 33.

Further, three straightening vanes 34 arranged along the flow direction of the exhaust gas are provided in the vicinity of the corner portion 28b of the outer peripheral portion 28, in the middle of the exhaust gas passage on the upstream side of the diffusion plate 30. When the exhaust gas that has been introduced into the return portion 18 from the plurality of holes 25a of the first ring-shaped member 25 flows to the opening portion 27a of the second ring-shaped member 27 by way of the corner portion 28b side, the straightening vanes 34 prevent the flow rate of the exhaust gas passing through the outside from becoming relatively faster than the flow rate of the exhaust gas passing through the inside. Accordingly, when the exhaust gas reaches the diffusion plate 30, the flow of the exhaust gas is equalized, and then introduced into the downstream side exhaust gas passage 20.

The straightening vanes for equalizing the flow rate of the exhaust gas are fixed, by welding or the like, to either the side surface 12b of the main body 12 or the inner surface 11a of the cap 11. The straightening vanes may be in contact with a surface on the unfixed side, but do not necessarily need to be in contact therewith.

Figure 4:
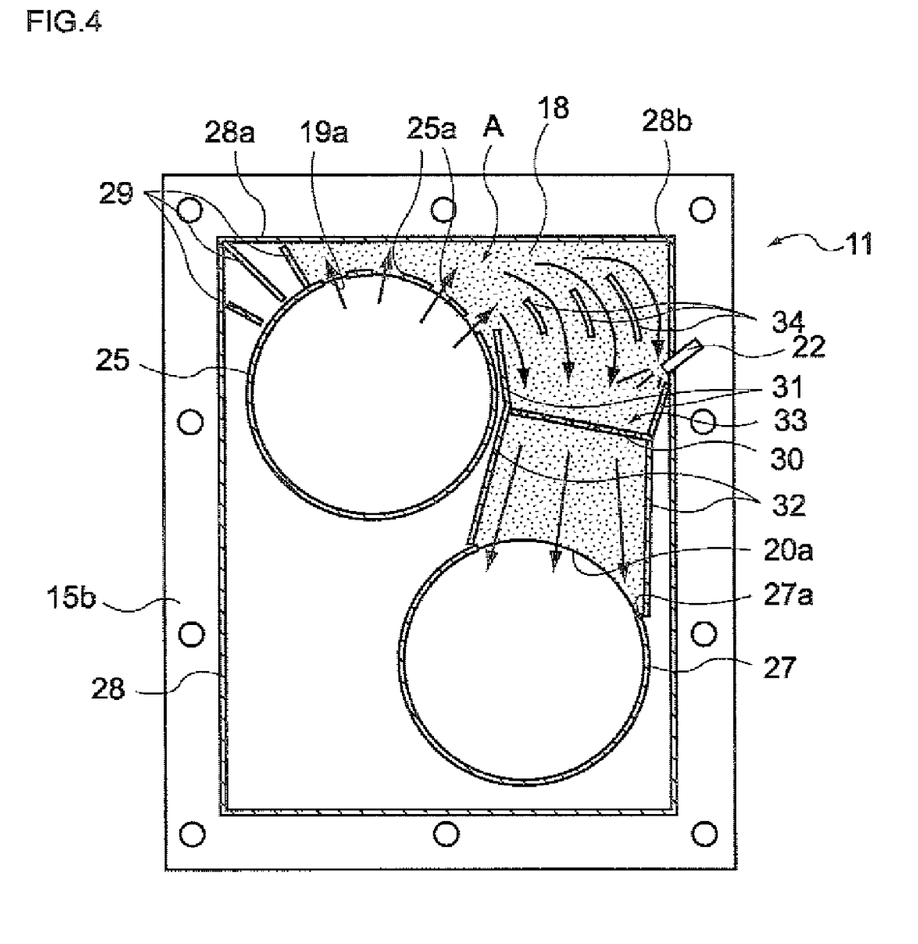
FIG. 4 is a diagram illustrating the flow of exhaust gas in the return portion.

FIG. 4 is a diagram illustrating an exhaust gas flow path in a case where the return portion 18 of the exhaust gas purification device 10 of the present embodiment is structured as shown in FIG. 2. In FIG. 4, a region A indicates a region in which exhaust gas flows.

As described above, the first ring-shaped member 25, the second ring-shaped member 27, the third guide plates 29, the first guide plates 31 and the second guide plates 32 are respectively fixed to the inner surface lie of the cap 11, and serve as shielding plates that are in contact with the side surface 12b of the main body 12. These shielding plates define the flow path through which exhaust gas flows. In the structure of the exhaust gas purification device 10 of the present embodiment, the flow direction is not linearly defined, from the outlet side opening 19a to the upstream side exhaust gas passage 19 to the inlet side opening 20a of the downstream side exhaust gas passage 20. This is in order to secure space for positioning a reducing agent diffusion portion, such as a diffusion plate, and for positioning a reducing agent supply portion on the upstream side of the reducing agent diffusion portion, without increasing the size of the external shape of the exhaust gas purification device, and to provide sufficient length to ensure that the reducing agent is easily mixed with and diffused into the exhaust gas.

In the exhaust gas purification device 10 of the present embodiment structured as described above, the exhaust gas that has been introduced into the return portion 18 from the plurality of holes 25a of the first ring-shaped member 25 flows toward the diffusion plate 30 while the flow rate is equalized, in mid flow, by the straightening vanes 34 arranged in the vicinity of the corner portion 28b where variations in the flow rate are likely to occur. Then, the reducing agent is injected and supplied into the exhaust gas from the reducing agent supply portion 22 on the upstream side of the diffusion plate 30, and the exhaust gas mixed with the reducing agent passes through the diffusion plate 30. Thus, the reducing agent is vaporized in the exhaust gas, and mixing is facilitated. After that, the exhaust gas is directed to the downstream side exhaust gas passage 20 via the opening portion 27a of the second ring-shaped member 27. As a result, it is possible to diffuse and introduce the reducing agent into the $NO_x$ reduction catalyst 23 disposed in the downstream side exhaust gas passage 20.

Further, the exhaust gas purification device 10 of the present embodiment has a structure in which the inner space is formed as the return portion 18 by attaching the cap 11 to the main body 12. Therefore, the ring-shaped members, the guide plates, the diffusion plate and the like can easily be provided in the return portion 18.

2. Modified Example

It is needless to mention that the structure of the exhaust gas purification device that has been described above is only an example of the structure, and various modified examples are possible in addition to this example.

Figure 5:
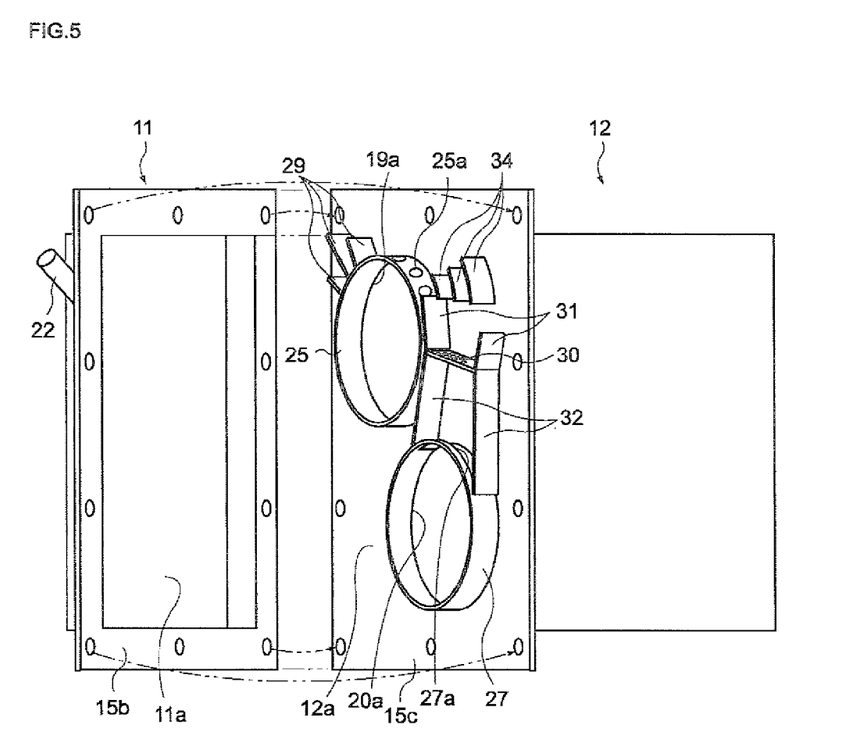
FIG. 5 is a diagram showing another example of the structure of the return portion.

For example, as shown in FIG. 5, the first ring-shaped member 25, the second ring-shaped member 27, the third guide plates 29, the first guide plates 31 and the second guide plates 32 may be fixed, by welding or the like, to the side surface 12b of the main body 12, instead of to the cap 11 side.

Figure 6:
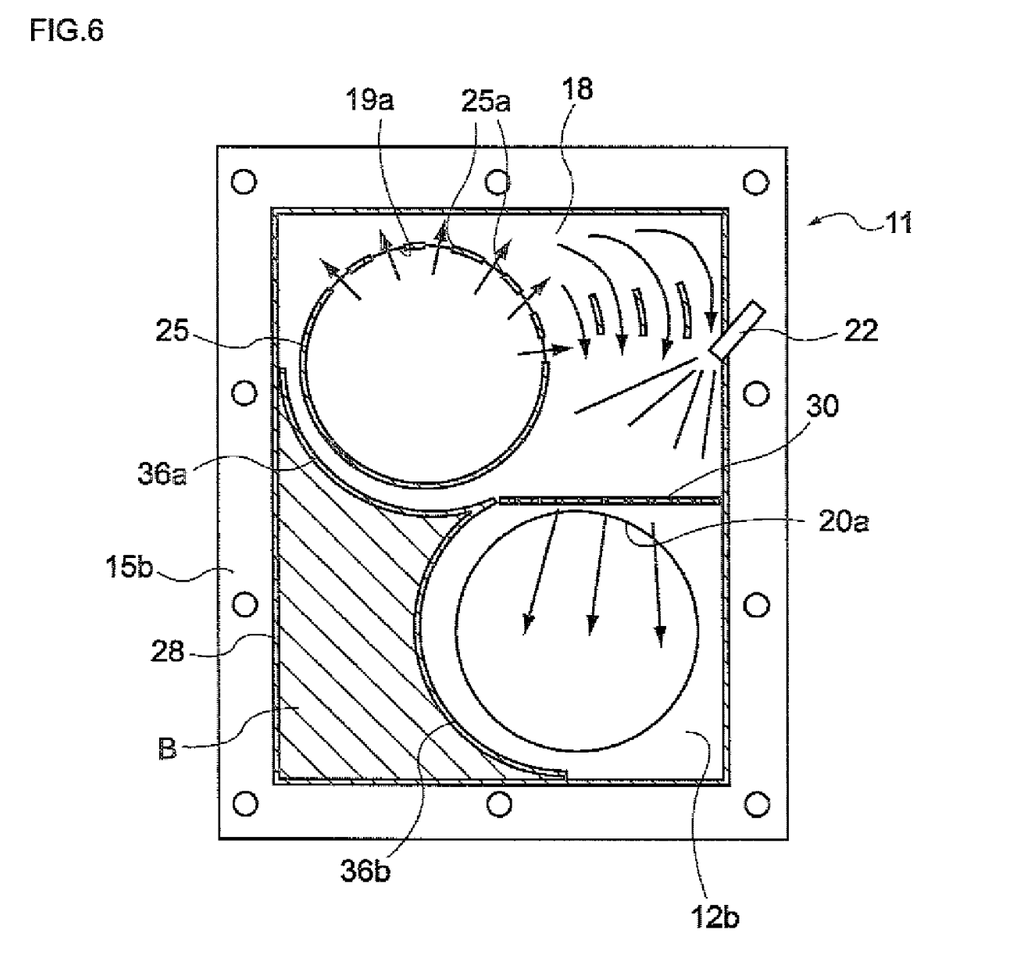
FIG. 6 is a diagram showing another example of the structure of a guide portion.

Further, the positional arrangement of the guide plates and the like may be appropriately designed, depending on the exhaust gas flow. FIG. 6 shows another example of the positioning of guide plates, and shows an example of the structure in which an exhaust gas flow path is defined using guide plates 36a and 36b that are respectively in contact with the side surface 12b of the main body 12 and the inner surface 11a of the cap 11, and a ring-shaped member is not used. In this example, a region (a region B in the figure) is formed, into which exhaust gas is not allowed to flow by the two arc-shaped guide plates 36a and 36b. Meanwhile, the exhaust gas that flows from the upstream side exhaust gas passage 19 is directed to the diffusion plate 30, and the exhaust gas that has passed through the diffusion plate 30 is directed to the inlet side opening 20a of the downstream side exhaust gas passage 20.

Figure 7:
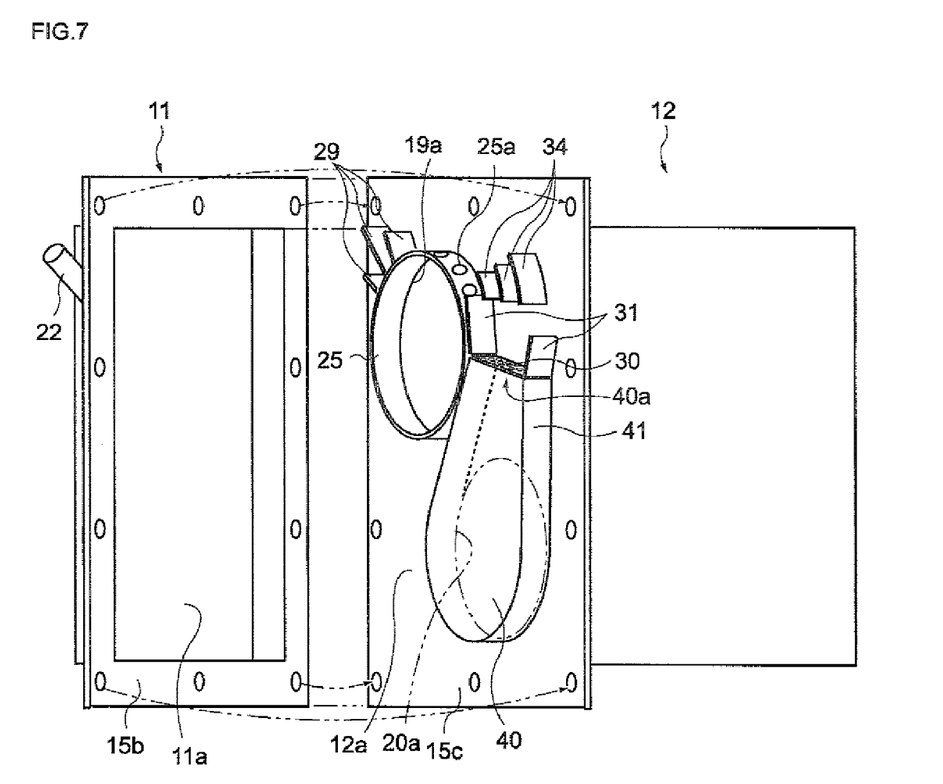
FIG. 7 is a diagram showing an example of the structure in which a guide cap member is used.

Further, a structure such as that shown in FIG. 7 may be adopted in which, instead of the ring-shaped member that is arranged on the inlet side opening of the downstream side exhaust gas passage in the return portion, a guide cap member 40 that is arranged to cover the inlet side opening 20a of the downstream side exhaust gas passage 20 is provided.

The guide cap member 40 has an exhaust gas feed port 40a that has a flow passage area smaller than that of the inlet side opening 20a of the downstream side exhaust gas passage 20. A linear-shaped portion 41 that extends continuously from the feed port 40a is formed as a guide portion that functions in a similar manner to the second guide plates 32 in the example of FIG. 2. Further, the diffusion plate 30 serving as a reducing agent diffusion portion is arranged on the feed port 40a, and the exhaust gas that flows into the inlet side opening 20a of the downstream side exhaust gas passage 20 is caused to pass through the diffusion plate 30.

With the use of the above-described guide cap member 40, the exhaust gas feed port 40a functions as a constricted portion, and the flow rate of the exhaust gas is increased by the constricted portion. At the same time, the exhaust gas passes through the diffusion plate 30. Therefore, mixing of the reducing agent with the exhaust gas is facilitated. Further, the exhaust gas that has passed through the diffusion plate 30 is easily diffused and introduced into the inlet side opening 20a of the downstream side exhaust gas passage 20.

It should be noted that, with the exception of the $NO_x$ reduction catalyst 23 arranged in the downstream side exhaust gas passage, the upstream side oxidation catalyst, the particulate filter and the downstream side oxidation catalyst can be omitted if necessary. In this case, if a space is provided in the upstream side exhaust gas passage, an injection nozzle and a reducing agent injection valve that serve as the reducing agent supply portion can be provided in the upstream side exhaust gas passage. Even when the reducing agent supply portion is arranged in the upstream side exhaust gas passage, if the exhaust gas including the reducing agent is caused to pass through the return portion, in which a prescribed guide portion and the reducing agent diffusion portion are arranged, and to flow into the downstream side exhaust gas passage, vaporization and mixing of the reducing agent is facilitated. Thus, the exhaust gas including the reducing agent that is diffused into the exhaust gas can be caused to flow into the $NO_x$ reduction catalyst arranged in the downstream side exhaust gas passage.

The invention claimed is:

1. An exhaust gas purification device comprising:
an exhaust gas passage having a return portion;
a reducing agent supply portion which is arranged in the return portion or in an upstream side exhaust gas passage disposed on an upstream side of the return portion, the reducing agent supply portion supplying a reducing agent into the exhaust gas passage;
a reduction catalyst which is arranged in a downstream side exhaust gas passage disposed on a downstream side of the return portion and which reduces and purifies nitrogen oxide using the reducing agent; and
a housing having a main body in which the upstream side exhaust gas passage and the downstream side exhaust gas passage are housed, and a cap which is attached to a first surface of the main body that is provided with an outlet side opening of the upstream side exhaust gas passage and an inlet side opening of the downstream side exhaust gas passage, and the return portion being formed by a space surrounded by the main body and the cap, wherein at least one of the first surface of the main body and a second surface in the cap which faces the first surface is provided with a guide portion for guiding an exhaust gas flow, the guide portion being arranged in a direction intersecting with the first surface and the second surface, and is provided with a reducing agent diffusion portion for facilitating mixing of the reducing agent with the exhaust gas, the reducing agent diffusion portion being arranged in a middle region of the flow of the exhaust gas guided by the guide portion, the guide portion includes a first ring-shaped member having opening portions, a second ring-shaped member having an opening portion, first guide plates and second guide plates, and the first ring-shaped member is directly connected to the outlet side opening of the upstream side exhaust gas passage and the second ring-shaped member is directly connected to the inlet side opening of the downstream side exhaust gas passage, and the first guide plates guide the exhaust gas flow poured out from the opening portions of the first ring-shaped member to the reducing agent diffusion portion, and the second guide plates guide the exhaust gas flow passing through the reducing agent diffusion portion to the opening portion of the second ring-shaped member.

2. The exhaust gas purification device according to claim 1, wherein the guide portion includes straightening vanes for evenly guiding the exhaust gas to the reducing agent diffusion portion.

3. The exhaust gas purification device according to claim 2, wherein the straightening vanes are disposed parallel to each other.

4. The exhaust gas purification device according to claim 1, wherein the reducing agent supply portion is arranged upstream of the reducing agent diffusion portion in the return portion.

5. The exhaust gas purification device according to claim 4, wherein the guide portion includes straightening vanes for evenly guiding the exhaust gas to the reducing agent diffusion portion.

6. The exhaust gas purification device according to claim 5, wherein the straightening vanes are disposed upstream of the first guide plates.

7. The exhaust gas purification device according to claim 5, wherein the straightening vanes are disposed laterally between opposing ones of the first guide plates.

8. The exhaust gas purification device according to claim 1, wherein the guide portion includes shielding plates that are respectively in contact with the first surface and the second surface.

9. The exhaust gas purification device according to claim 8, wherein the guide portion includes straightening vanes for evenly guiding the exhaust gas to the reducing agent diffusion portion.

10. The exhaust gas purification device according to claim 8, wherein the reducing agent supply portion is arranged upstream of the reducing agent diffusion portion in the return portion.

11. The exhaust gas purification device according to claim 10, wherein the guide portion includes straightening vanes for evenly guiding the exhaust gas to the reducing agent diffusion portion.

* * * * *